Patented Dec. 14, 1937

2,101,879

UNITED STATES PATENT OFFICE 2,101,879

PARA-HYDROXY-PARA'-ETHOXY DIPHENYLAMINE

George C. Strouse, Wilmington, Del., assignor to E. I. du Pont de Nemours & Company, Wilmington, Del., a corporation of Delaware No Drawing. Application July 25, 1936, Serial No. 92,605

10 Claims. (Cl. 260—128)

This invention relates to para-hydroxy-para'-ethoxy diphenylamine and a process for the production thereof.

In German Patent No. 333,897 a process is described for the production of indophenol-like compounds by the condensation of phenol-alkyl-ethers having a free para- position or containing an alkoxy group. These products are said to turn blue in the presence of alkali and to dissolve in sodium sulfide solution forming slightly colored solutions which turn blue on exposure to air. One of the products is obtained from phenetol and nitrosophenol. In Friedlander, 13, 350, the following statement is found: "In case the assumed formulation of the dyestuff compound in DRP 333,897 is correct, not only phenols, but also phenol ethers (as with the diazo compounds) unite with nitrosophenols to form ethers of indophenols of the type

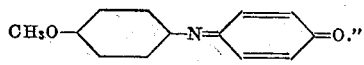

Stelzner, Literatur-Register der Organischen Chemie, Volume 5, page 1227, found the compound "oxy-4-ethoxy-4'-diphenylamine" with reference to German Patent No. 333,897. It is believed, in view of the invention hereinafter described, that the compound obtained in accordance with German Patent No. 333,897 is not para-hydroxy-para'-ethoxy diphenylamine and that Friedlander and Stelzner have made incorrect assumptions.

It is an object of this invention to produce para-hydroxy-para'-ethoxy diphenylamine. A further object is the provision of a new and improved process for producing said compound. Other objects will appear hereinafter.

In accomplishing these objects in accordance with the invention, para-hydroxy-para'-ethoxy diphenylamine has been prepared by the condensation of para-phenetidine and hydroquinone in the presence of a catalyst such as zinc chloride.

The invention will be further illustrated but is not limited as to proportions, temperature, etc., by the following example in which the quantities are stated in parts by weight.

Example

One hundred (100) parts of para-phenetidine were put into a suitable vessel equipped with an agitator. The agitator was started and the para-phenetidine was heated to 100° C. Then 80 parts of hydroquinone were added, followed by 3 parts of zinc chloride. This mixture was heated to 210°–215° C. during two hours and held at that temperature for another two hours or until the reaction was complete. The vessel was provided with a cover to allow the water which formed in the reaction to escape as a vapor and, at the same time, minimize the loss of para-phenetidine and hydroquinone by vaporization.

While the charge was being heated at 210°–215° C., a solution of 730 parts of water, 29 parts of 100% sodium hydroxide (as 30% solution) and 10 parts of sodium sulfhydrate 100% (as 35% solution) was prepared in another vessel. As soon as the period of heating at 210°–215° C. was finished, the molten charge was transferred to the alkaline sulfide solution with good agitation. This mixture was heated to 75° C. and stirred for one hour. Then the solution was filtered to remove any insoluble residue. The residue was washed with 365 parts of hot (70° C.) water containing 4 parts of sodium hydroxide 100% and 5.5 parts of sodium sulfhydrate 100%. Finally, the residue was washed with about 100 parts of water. The residue was apparently di-(para-phenetyl)-para-phenylene-diamine.

The filtrate and washings were collected in a vessel and cooled to 30° C. Para-hydroxy-para'-ethoxy diphenylamine was then precipitated from the solution by adding 30% sulfuric acid until the liquid was neutral to thymolphthalein test paper and alkaline to phenolphthalein. In this way, para-hydroxy-para'-ethoxy diphenylamine was precipitated in what appeared to be an amorphous condition, but changed quickly into a crystalline form. If acid is added until the solution is acid to litmus, some impurity is precipitated with the para-hydroxy-para'-ethoxy diphenylamine.

The precipitated para-hydroxy-para'-ethoxy diphenylamine was filtered off from the liquid which was still alkaline to phenolphthalein. It was washed on the filter with a solution of 15 parts of sodium bisulfite in 185 parts of cold water until the washings were no longer alkaline to Brilliant Yellow test paper. Then it was washed with cold water to remove the bisulfite. It may be dried in a vacuum oven at 60° C. The dry material prepared in this way melted at about 83°–84° C. The purpose of washing the press-cake with bisulfite solution is to prevent oxidation of the para-hydroxy-para'-ethoxy diphenylamine when exposed to air.

Para-hydroxy-para'-ethoxy diphenylamine may be recrystallized from hot water. On cooling, snow-white crystals are formed. After drying in a vacuum desiccator over sulfuric acid, these crystals melt at 85.5°–86° C. When exposed to air they slowly become gray with a reddish-brown tint. Para-hydroxy-para'-ethoxy diphenylamine dissolves in dilute sodium hydroxide solution, forming a nearly colorless solution which oxidizes to a red or reddish-brown color on exposure to air. Its alkaline sulfide solutions also oxidize to red or reddish-brown.

While the invention is not limited to any theory, para-phenetidine and hydroquinone apparently react according to the following equation:

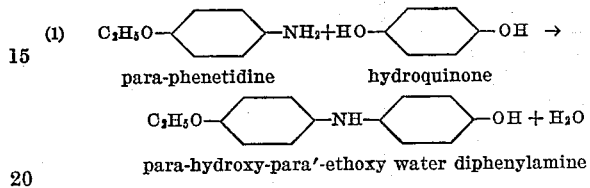

The alkali-insoluble by-product appears to be formed by side reactions of two molecules of para-phenetidine on one molecule of hydroquinone or by the action of one molecule of para-phenetidine and one molecule of para-hydroxy-para'-ethoxy diphenylamine, as illustrated by Equations (2) and (3), respectively:

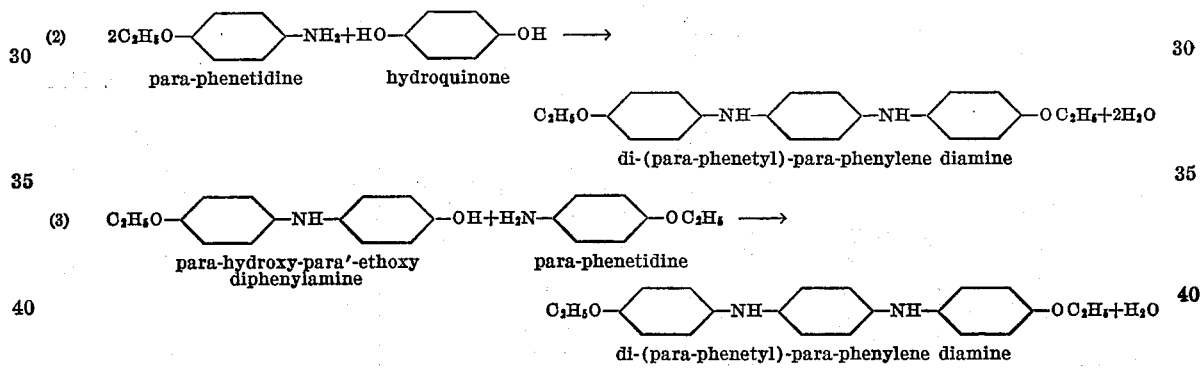

The time and temperature of the reaction can be varied through a wide range. Temperatures from 180° C. to 230° C. have been used, and it is probable that both higher and lower temperatures than these could be used. At a low temperature a longer time is required and at a high temperature a shorter time.

Other acid condensing agents, as, for example, ferric chloride, hydrochloric acid and aluminum chloride, may be used instead of zinc chloride. The proportion of the condensing agent may vary but, generally speaking, should preferably correspond to 1 to 5% by weight of the reaction mixture.

The proportions of para-phenetidine and hydroquinone may be varied somewhat. Ordinarily, it is preferable to use approximately equi-molecular proportions. The invention may be carried out, however, with some advantage by the use of up to 10% excess of para-phenetidine over the theoretical proportions.

The order of addition of the reactants is not considered to be particularly important, although it is more convenient to mix them in such a way that the mixture remains liquid. For instance, if the hydroquinone and para-phenetidine are mixed cold, the mass will solidify and it is more convenient to mix them in such a way that the mixture remains liquid. Hence, it is preferable to effect the mixing with the aid of heat. In making the mixture, the hydroquinone may be added to heated phenetidine, or vice versa.

The reaction vessel may be suitably made of glass, enamel, stainless steel, nickel or "Monel" metal. Iron vessels appear to be unsuitable for the reaction.

Para-hydroxy-para'-ethoxy diphenylamine produced in accordance with the invention is a useful dye intermediate; for example, by sulfurization it may be converted to a sulfur color. It may also be used as a gum inhibitor in gasoline or as a means of preventing deterioration of rubber. In its oxidized form, that is, as para-ethoxy-phenyl-imino-quinone, it may be used as a gasoline dye.

It will be apparent from the description given above that para-hydroxy-para'-ethoxy diphenylamine does not have the properties attributed to the indophenol-like compounds of German Patent No. 333,897. It is not blue in the presence of alkali and its sulfide solutions do not oxidize to a blue color. On the contrary, it dissolves in dilute sodium hydroxide solution forming a nearly colorless solution and its sulfide solutions oxidize to red or reddish-brown colors instead of blue. So far as is known, therefore, this compound has not heretofore been described in the art and is a new and useful material.

As many apparently widely different embodiments of this invention may be made without departing from the spirit and scope thereof, it is to be understood that I do not limit myself to the specific embodiments thereof except as set forth in the appended claims.

I claim:

1. Para-hydroxy-para'-ethoxy diphenylamine in the form of white to gray crystals which dissolve in dilute aqueous sodium hydroxide and alkali metal sulfide to produce nearly colorless solutions that oxidize to a red to reddish-brown color, said crystals when purified and dried over sulfuric acid melting at 85.5° to 86° C.

2. Substantially pure para-hydroxy-para'-ethoxy diphenylamine in the form of snow-white crystals which change to gray with a reddish-brown tint on exposure to air, dissolve in dilute aqueous sodium hydroxide and alkali metal sulfide to produce nearly colorless solutions that oxidize to a red to reddish-brown color, said crystals melting at 85.5° to 86° C.

3. In a process of producing para-hydroxy-para'-ethoxy diphenylamine, the step which comprises condensing hydroquinone with para-phenetidine in the presence of a small amount of an acid condensation catalyst under the influence of heat.

4. In a process of producing para-hydroxy-para'-ethoxy diphenylamine, the step which comprises condensing hydroquinone with para-phenetidine in the presence of a small amount of zinc chloride under the influence of heat.

5. The process of producing para-hydroxy-para'-ethoxy diphenylamine which comprises condensing hydroquinone with para-phenetidine in the presence of a small amount of zinc chloride under the influence of heat, mixing the reaction product with an alkali metal sulfide solution, separating any insoluble residue, and precipitating para-hydroxy-para'-ethoxy diphenylamine from the residual liquid by the addition of an acid.

6. The process of producing para-hydroxy-para'-ethoxy diphenylamine which comprises condensing hydroquinone with para-phenetidine in the presence of a small amount of zinc chloride under the influence of heat, mixing the reaction product with an alkali metal sulfide solution, separating any insoluble residue, and precipitating para-hydroxy-para'-ethoxy diphenylamine from the residual liquid by the addition of an acid until the liquid is neutral to thymolphthalein paper and alkaline to phenolphthalein.

7. In a process of producing para-hydroxy-para'-ethoxy diphenylamine, the step which comprises condensing hydroquinone with para-phenetidine in the presence of a small amount of zinc chloride at a temperature within the range of 180° to 230° C.

8. The process of producing para-hydroxy-para'-ethoxy diphenylamine which comprises condensing hydroquinone with para-phenetidine in the presence of a small amount of zinc chloride at a temperature within the range of 180° to 230° C., mixing the reaction product with an alkali metal sulfide solution, separating any insoluble residue, and precipitating para-hydroxy-para'-ethoxy diphenylamine from the residual liquid by the addition of an acid.

9. The process of producing para-hydroxy-para'-ethoxy diphenylamine which comprises condensing hydroquinone with para-phenetidine in the presence of a small amount of zinc chloride at a temperature within the range of 180° to 230° C., mixing the reaction product with an alkali metal sulfide solution, separating any insoluble residue, and precipitating para-hydroxy-para'-ethoxy diphenylamine from the residual liquid by the addition of an acid until the liquid is neutral to thymolphthalein paper and alkaline to phenolphthalein.

10. The process of preparing para-hydroxy-para'-ethoxy diphenylamine which comprises heating about 100 parts of para-phenetidine to about 100° C., adding about 80 parts of hydroquinone followed by about 3 parts of zinc chloride, then heating the mixture to about 210° to about 215° C. in about two hours, maintaining said temperature for another two hours while allowing water formed in the reaction to escape, adding the molten reaction product to sodium sulfide solution, heating the mixture to about 75° C. for one hour, separating any insoluble residue, then cooling the residual liquid to about 30° C., adding 30% sulfuric acid until the liquid is neutral to thymolphthalein test paper but alkaline to phenolphthalein, whereby para-hydroxy-para'-ethoxy diphenylamine is precipitated in substantially pure form.

GEORGE C. STROUSE.